United States Patent [19]
Unland

[11] Patent Number: 5,332,380
[45] Date of Patent: Jul. 26, 1994

[54] EXTRUSION HEAD FOR AN EXTRUSION INSTALLATION OF THE RUBBER OR PLASTIC PROCESSING INDUSTRY

[75] Inventor: Eckhard Unland, Hanover, Fed. Rep. of Germany

[73] Assignee: Paul Troester Maschinenfabrik, Hanover, Fed. Rep. of Germany

[21] Appl. No.: 157,610

[22] Filed: Nov. 23, 1993

[51] Int. Cl.$^5$ .................. B29C 47/12; B29C 47/92
[52] U.S. Cl. .................. 425/135; 425/155; 425/186; 425/188; 425/790; 425/192 R; 425/461; 425/462; 264/40.1
[58] Field of Search .............. 425/135, 150, 155, 162, 425/188, 190, 191, 192 R, 450.1, 131.1, 462, 461, 183, 186; 264/40.1, 171, 176.1; 150/244.11, 500

[56] References Cited

U.S. PATENT DOCUMENTS

| | | | |
|---|---|---|---|
| 3,902,835 | 9/1975 | Theysohn | 425/188 |
| 4,137,027 | 1/1979 | Ruger | 425/188 |
| 4,652,224 | 3/1987 | Golisch | 425/131.1 |
| 4,824,353 | 4/1989 | Hirchkorn | 425/190 |
| 5,016,184 | 5/1991 | Gutjahz | 425/135 |
| 5,061,166 | 10/1991 | Gohlisch et al. | 425/188 |
| 5,242,290 | 9/1993 | Hizaiwa et al. | 425/131.1 |

FOREIGN PATENT DOCUMENTS 2201631 9/1978 Fed. Rep. of Germany.
3430062 2/1986 Fed. Rep. of Germany.

*Primary Examiner*—Khanh Nguyen
*Attorney, Agent, or Firm*—Emmanuel J. Lobato; Robert E. Burns

[57] ABSTRACT

An extrusion head for an extrusion installation for extruding plastic material and having two, three or four extrusion cylinders has a stationary part which is fixedly mounted on the discharge ends of the extrusion cylinders and has flow channels for directing extrudate leading from the cylinders to a central extrusion location at which there is a seat for an extrusion die. Two movable extrusion head parts are hinged on the stationary part for movement between a closed position in which the movable extrusion head parts define an extrusion orifice for the extrudate and hold the extrusion die on its seat and an open position for cleaning. The movable extrusion head parts are moved between open and closed position by piston-cylinder units having cylinders pivotally mounted on the stationary part and having piston rods pivotally connected to lugs on the movable extrusion head parts. Other piston-cylinder units having cylinders mounted on the stationary extrusion head part have piston rods formed as draw bars on which are pivotally mounted tie rods actuated by further piston-cylinder units and having head portions engaging the respective movable extrusion head parts to press them into closed position. An electric-hydraulic system controlled by a central programmed control unit supplies hydraulic fluid to the piston-cylinder units to activate them in predetermined sequence for the opening and the closing of the extrusion head.

3 Claims, 6 Drawing Sheets

EXTRUSION HEAD FOR AN EXTRUSION INSTALLATION OF THE RUBBER OR PLASTIC PROCESSING INDUSTRY

FIELD OF INVENTION

The invention relates to an extrusion head for an extrusion installation of the rubber or plastic processing industry, consisting of a fixed part to be flanged to the extrusion installation and at least one part, abutting the extrusion die and deflectable for cleaning purposes, which is articulated to the fixed part by a hinge joint, pivotable by means of a piston-cylinder unit, and adapted to be clamped to the fixed part by means of a pair of tie rods actuated by an additional piston-cylinder unit for each.

BACKGROUND OF THE INVENTION

Such an extrusion head has become known from DE 34 30 062 C2 and, in another form of realization, from DE 37 36 231 A1. Both forms clamp the movable parts of the extrusion head together not by means of clamps and fast on the fixed extrusion head part, as is the case in DE 22 01 631 C3 and DE 22 36 363 A1 where the holding forces are absorbed by clamps which are displaced by piston-cylinder units and secured in their closing position, but rather they provide the necessary closing forces solely by piston-cylinder units. This makes it necessary to use very sturdy piston-cylinder units. These are very heavy and hard to move.

In the case of DE 34 30 062 C2, the piston-cylinder unit is articulated at its one end pivotable outwardly on the fixed part of the extrusion head; a pin fastened to the unit is displaceable in a sliding block in the form of an obliquely oriented slot. During the opening process, the piston-cylinder unit is pushed outward under the influence of this sliding block link, so that the tie rods are pivoted out of the movement path of the pivotable extrusion head parts for the opening process thereof. The pivoting of the piston-cylinder units moving the tie rods is so complex that a different solution was sought in DE 37 36 321 A1. This was realized with fixed piston-cylinder units whose piston rod is rotated during its displacement movement by means of a sliding block. At its free end, the piston rod carries a hammer head type part which engages behind two projections on the pivotable extrusion head part and by means of them transmits the closing forces to the pivotable extrusion head part. To open the extrusion head, first the tie rod is released, then the hammer head thereof is rotated 90 degrees, and then retracted between the two projections to clear the way for pivoting the associated pivotal extrusion head part. Long piston-cylinder units, a complex rotating mechanism, and long closing and opening times are the disadvantages of this known extrusion head.

In DE 42 36 120 C1 there is disclosed an extrusion head for extrusion apparatus of the rubber or plastic industry consisting of a stationary part flanged on an extrusion installation and at least one movable part which is hinged on the stationary part and, for cleaning purposes, movable by means of a piston-cylinder unit between open and closed positions and is clamped in closed position by a pair of draw bars actuated by a further piston-cylinder unit. The coordination of movement of the several parts of the mechanism presented difficulty in operation of the apparatus.

SUMMARY OF THE INVENTION

It is an object of the invention to provide a simple solution with low cost construction for opening and closing movable parts of an extrusion head and for clamping the parts in closed position and to assure a predetermined sequence of steps in the opening and closing operations.

The invention consists in that a stationary part of an extrusion head is fixedly mounted on the discharge end of one or more extruder cylinders and defines at least one guide channel for guiding extrudate from such cylinder or cylinders to an extrusion location at which there is provided a seat for an extrusion die for shaping the extrudate. Two movable extrusion head parts are hingedly mounted on the stationary part for movement between a closed position for defining an extrusion orifice for the extrudate and for holding the extrusion die on its seat and an open position for cleaning. The movable extrusion head parts are moved between open position and closed position by piston-cylinder units acting between the stationary extrusion head part and the respective movable extrusion head parts. When in closed position, the movable extrusion head parts are clamped by tie-rods having enlarged head portions engaging the respective movable parts and actuated by further piston-cylinder units. The several piston-cylinder units are activated and controlled by an electric-hydraulic control system comprising a hydraulic line for supplying hydraulic fluid under pressure, electromagnetic valves for controlling the flow of hydraulic pressure fluid to the respective piston-cylinder units and an electric circuit for controlling the electro-magnetic valves and including a central control unit for individually controlling the electro-magnetic valves to activate respective piston-cylinder units in predetermined sequence.

BRIEF DESCRIPTION OF THE DRAWINGS

The essence of the invention is explained below with reference to embodiments illustrated schematically in the accompanying drawings, in which.

DESCRIPTION OF THE EMBODIMENTS

Figure 1:
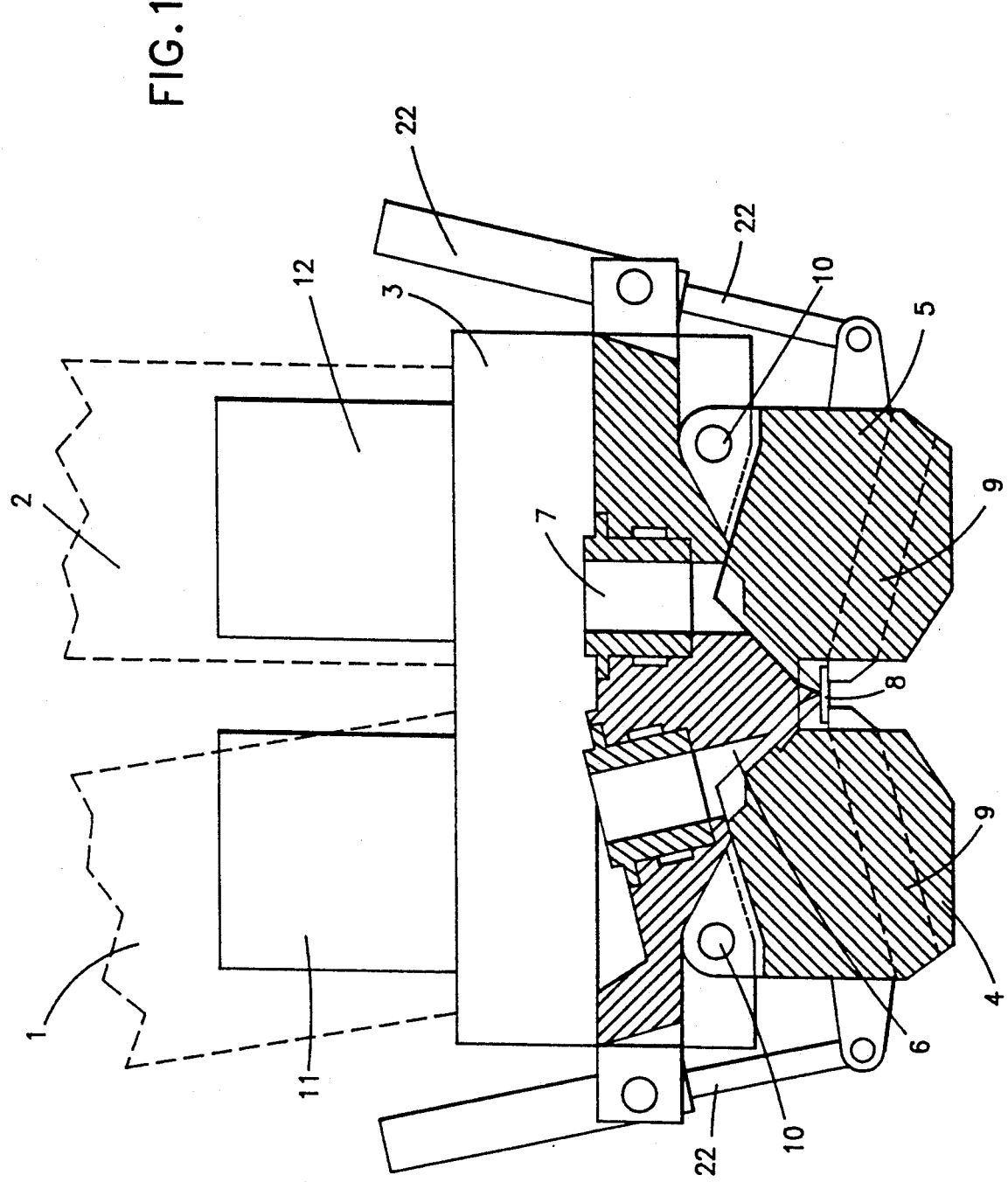
FIG. 1 is an axial sectional view through the extrusion head parts of an extrusion installation with two extruders.
Figure 2:
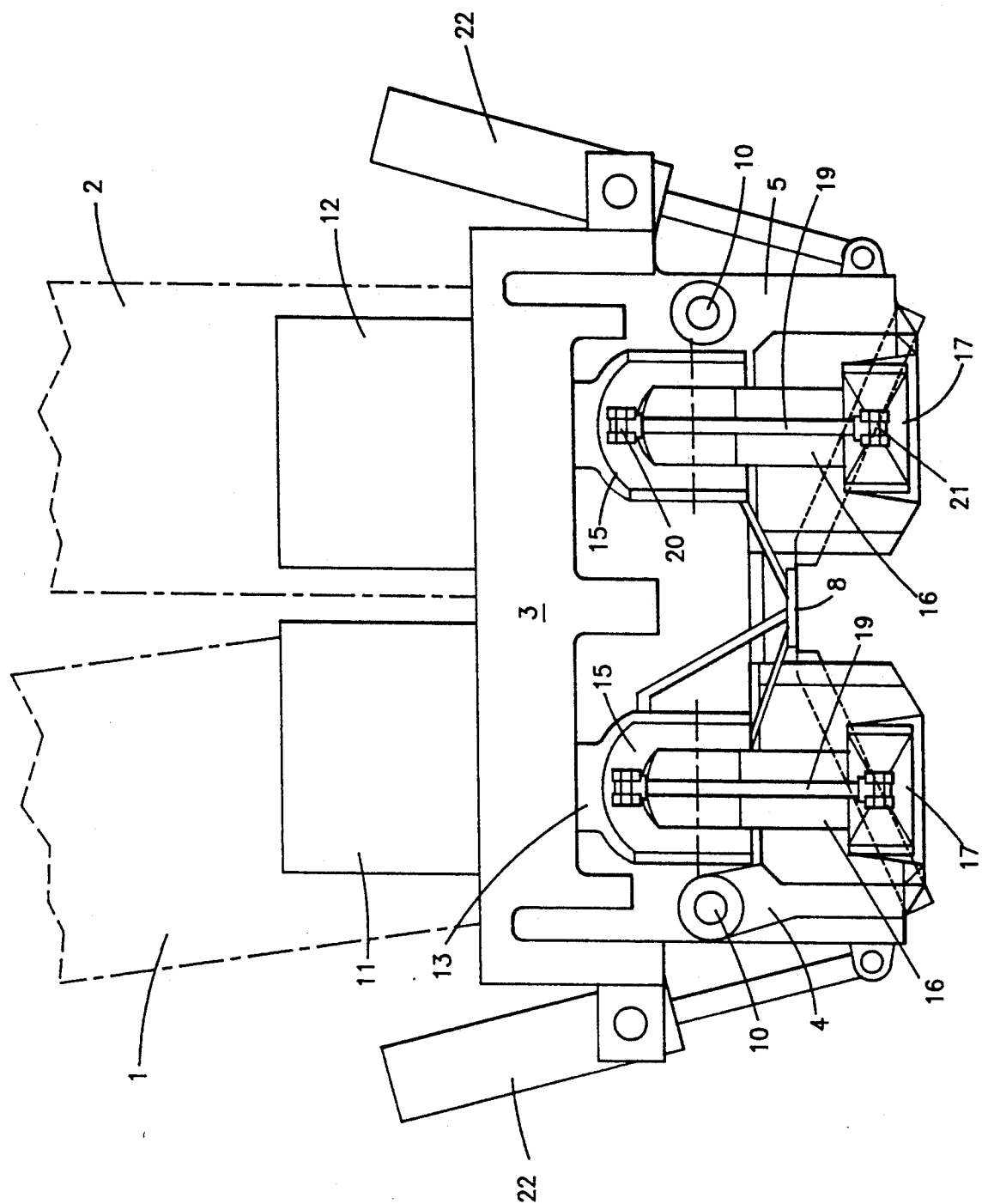
FIG. 2 is a side view of the extrusion head of FIG. 1.

The extrusion head of FIG. 1 consists of a fixed part 3 connected to two extruders 1, 2, and two movable hinged parts 4, 5 that can be swung to open position. The latter parts enclose between them guide channels 6, 7 for the extruded product as well as an extrusion die 8 for shaping the extruded product. This extrusion die 8 is clamped in its seat by holders 9 displaceable in cutouts in parts 4 and 5. The two movable, openable parts 4, 5 are fastened to the fixed part 3 of the extrusion head by hinge pins 10.

Figure 5:
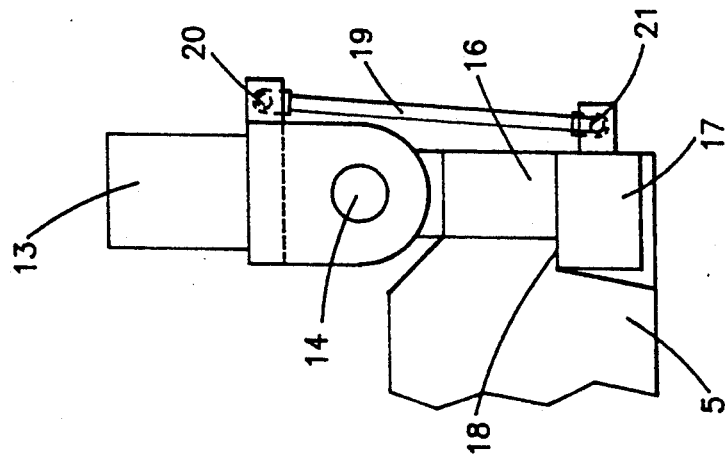
FIG. 5 is a top plan view of a movable extrusion head part with tie rod in the closed state.
Figure 4:
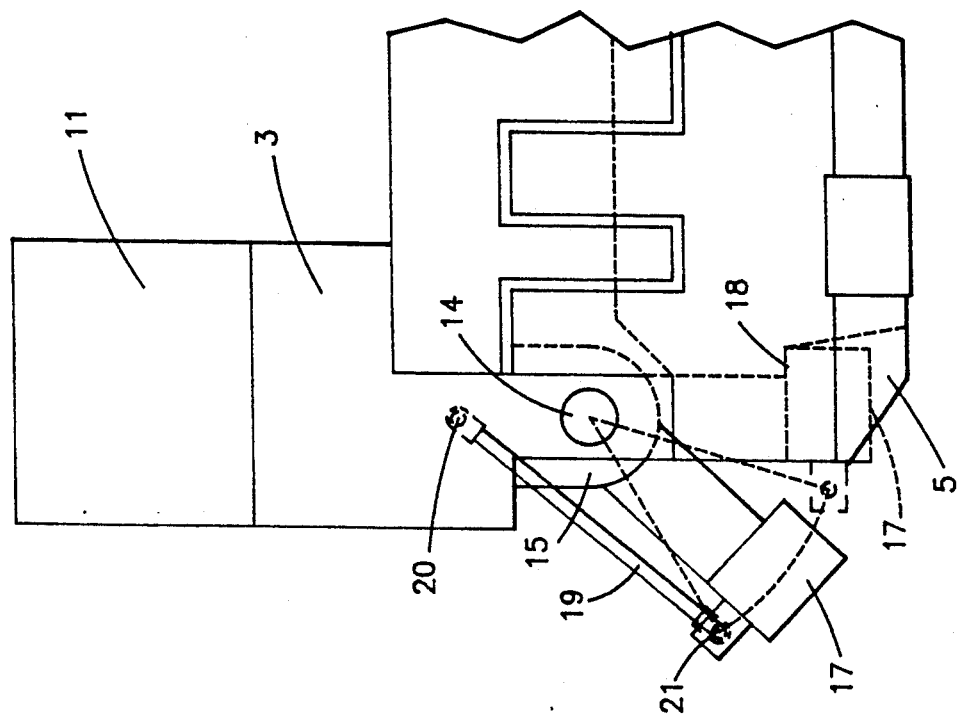
FIG. 4 is a top plan of a movable extrusion head part with tie rod in the open state.
Figure 3:
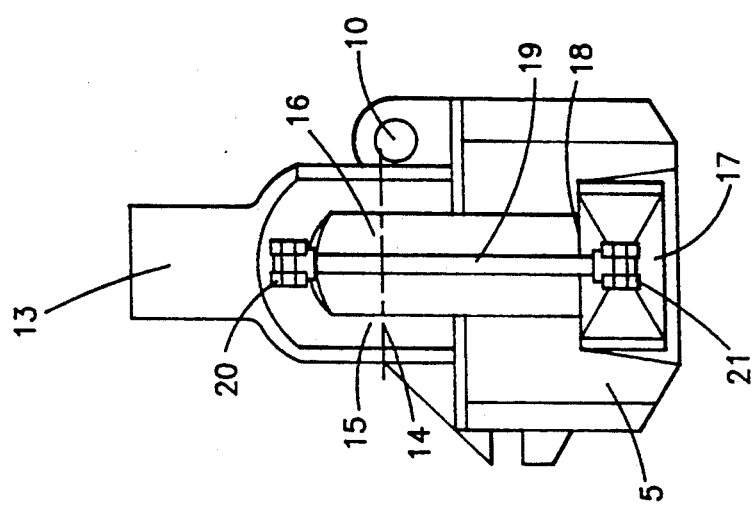
FIG. 3 is a side view of a movable extrusion head part with tie rod and pivoting piston-cylinder unit.

The movable hinged parts 4 and 5 are pivotally movable between an open state as shown in FIG. 4 and a closed state shown in FIG. 5 by means of piston-cylinder units 22 each having a cylinder pivotally mounted on the fixed extrusion head part 3 and pistons with piston rods, which are pivotally connected with lugs on the respective movable extrusion head parts 4 and 5.

Fastened to the sides of the fixed extrusion head part 3 are piston-cylinder units 11, 12, the piston rods 13 of which are made to form at their free end a forked drawbar 15 with a hinge pin 14. Pivotably mounted on this hinge pin 14 is a tie rod 16, the head 17 of which engages, in the closed state of the extrusion head, the abutment faces 18 of the movable extrusion head parts 4, 5 and presses these movable parts 4, 5 against the fixed extrusion head part 3 and against the extrusion die 8. At the head 17 of tie rod 16 is a bearing 21, in which is mounted one end of a piston-cylinder unit 19, the other end of which is mounted in a bearing 20 on the forked drawbar 15. This piston-cylinder unit 19 serves to pivot the tie rod 16 from the closed position of FIG. 5 into the open position of FIG. 4 and vice versa.

Figure 6:
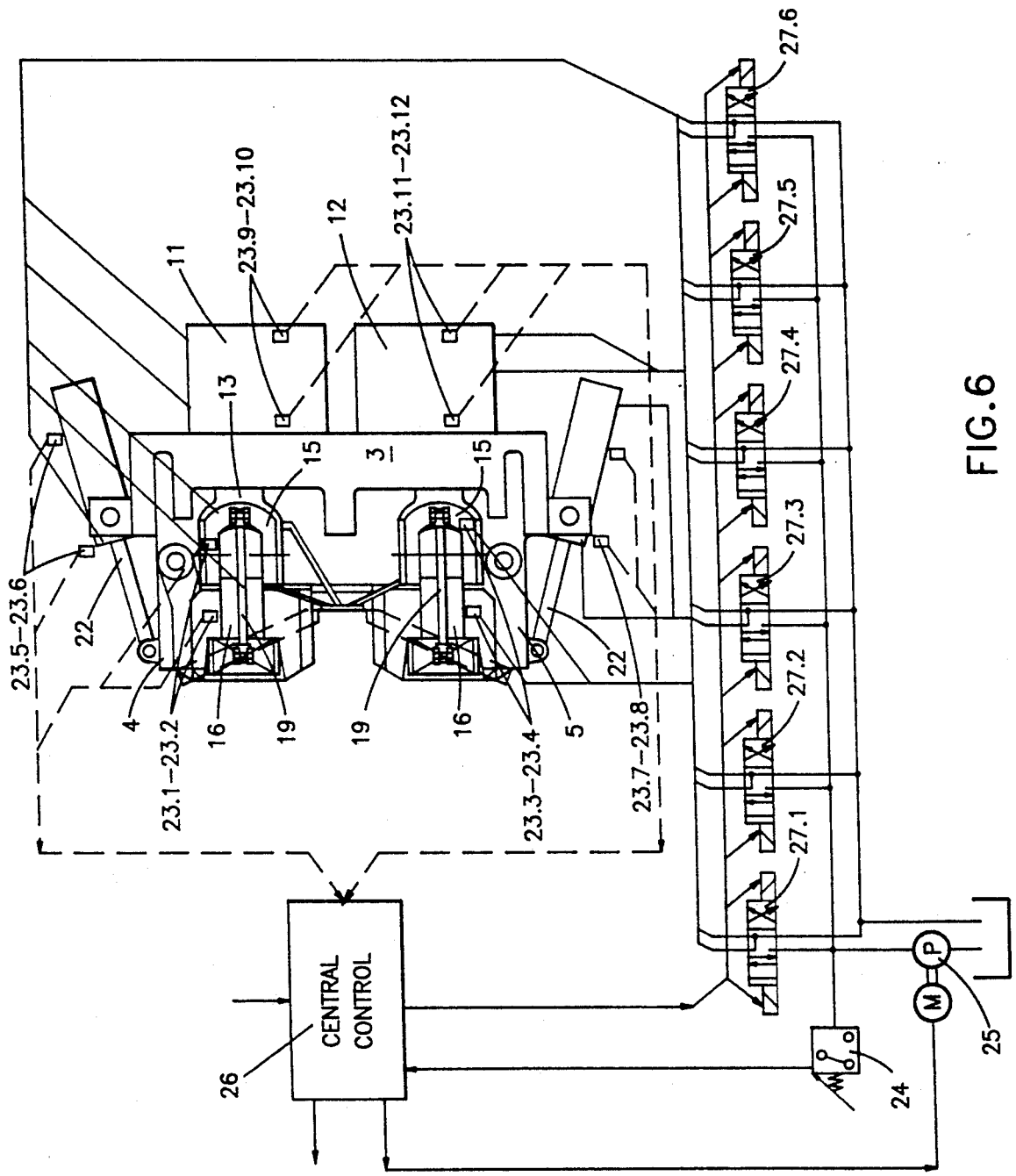
FIG. 6 is a schematic side view of the apparatus shown in conjunction with a circuit diagram of an electrical-hydraulic control system for supplying hydraulic fluid to the piston-cylinder units.

Operation of the extrusion head is controlled by an electric-hydraulic system which, as shown in FIG. 6, comprises a supply of hydraulic fluid, a pump 25 with a driving motor M, a pressure control unit 24 for controlling pressure of the fluid, limit switches 23.1 to 23.12 for the several piston-cylinder units of the system and electro-magnetic valves 27.1 to 27.6 controlling the supply of hydraulic fluid to the respective piston-cylinder units.

Thus electro-magnetic valves 27.1 and 27.2 control the flow of hydraulic fluid to and from piston-cylinder units 22 for moving the movable extrusion head units between closed position and open position. Electro-magnetic valves 27.3 and 27.4 control the flow of hydraulic fluid to and from piston-cylinder units 11 and 12 for actuating draw bars 13 and electro-magnetic valves 27.5 and 27.6 control the flow of hydraulic fluid to and from the piston cylinder units 19 for activating tie rods 16.

All operating sequences of the extrusion head are effected hydraulically, controlled by a central control unit 26, which is connected by electric lines with the electro-magnetic valves 27.1 to 27.6, which control the supply of hydraulic fluid to piston-cylinder units 11, 12, 19 and 22.

For moving the movable extrusion head parts 4 and 5 from closed position to open position for cleaning and inspection, the sequence of operations of the electro-magnetic valves as controlled by the central control unit 26 is as follows:

(1) Electro-magnetic valves 27.5 and 27.6 controlling piston-cylinder units 19 are activated to release tie rods 16 from movable extrusion head parts 4 and 5.

(2) Electro-magnetic valves 27.3 and 27.4 controlling piston-cylinder units 11, 12 for operating draw bars 13 to withdraw the tie rods 16 and draw bars from the movable extrusion head parts 4 and 5.

(3) Electro-magnetic valves 27.1 and 27.2 controlling piston-cylinder units 22 are activated to move the movable extrusion head parts 4 and 5 from the closed position to open position.

For moving the movable extrusion head parts 4 and 5 from open position to closed position, the electro-magnetic valves are activated by the central control unit 26 in reverse order.

The control unit is activated by an outside signal to start the sequence of operations controlled by the control unit 26 for opening the extrusion head for cleaning and the closing and clamping of the head for production. First the hydraulic pump 25 is started, and thereafter, through actuation of the associated electro-magnetic hydraulic valves, the respective operations are effected.

The successful completion of each operation is indicated in the control unit 26 by signals from electrical limit switches 23.1 to 23.12 associated with the respective piston-cylinder units and is there combined with a pressure control signal from the pressure control unit 24. The two signals "OPERATION COMPLETED" and "MAXIMUM PRESSURE REACHED" lead to the closing of the control valve. When the sequence of functions is completed, the pump is switched off and a signal on the control unit 26 indicates that the operation is completed. The control unit 26 is programmed in known manner to operate the piston-cylinder units sequentially as described.

Figure 7:
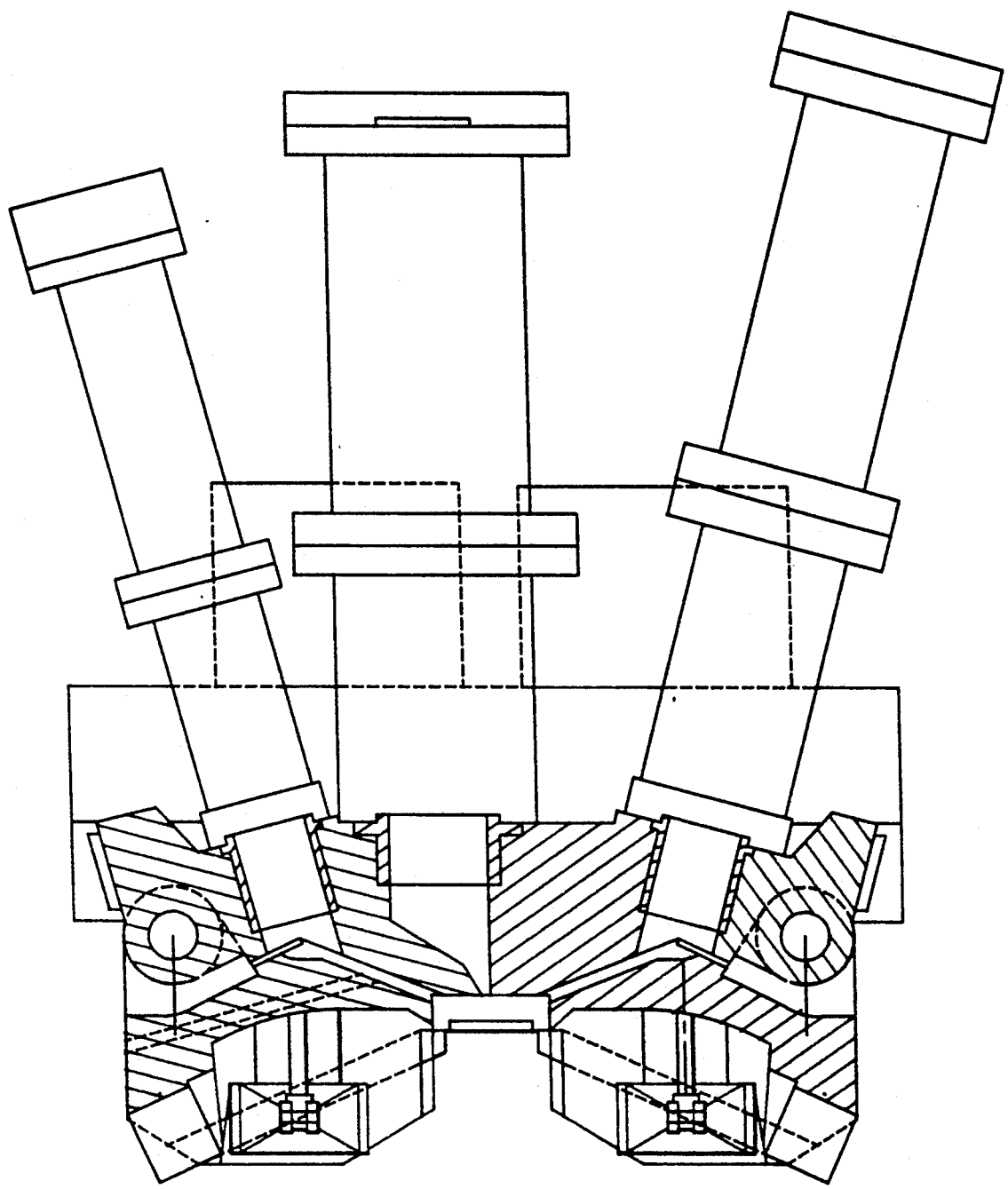
FIG. 7 is a side elevational view, partially in section, of an extrusion installation with three extruders.
Figure 8:
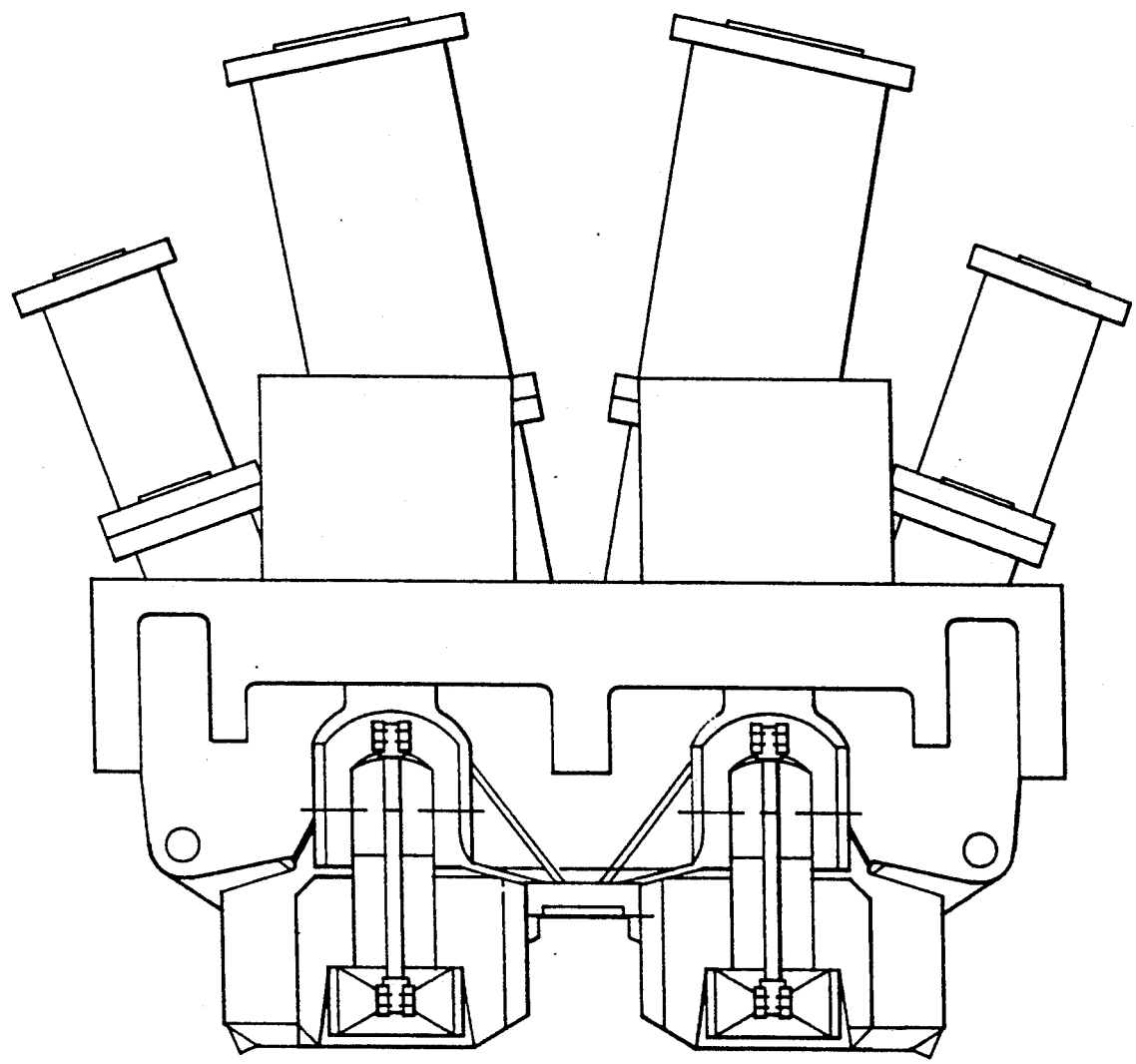
FIG. 8 is a side elevational view, partially in section, of an extrusion installation with four extruders.

FIGS. 7 and 8 show extrusion heads composed of the same parts for connection to three and four extruders respectively. The extrusion heads shown in FIGS. 7 and 8 are identical with the extrusion head described above except that the fixed extrusion head part 3 is designed to fit on three extrusion cylinders, as shown in FIG. 7, or on four extruder cylinders, as illustrated in FIG. 8, the fixed extrusion head part having appropriate internal channels for directing extrudate from the several extruder cylinders to a common extruder location. Otherwise, the extrusion head is constructed and operates in the manner described above.

What I claim is:

1. An extrusion head for an extrusion installation for extruding plastic material comprising at least one extruder cylinder having a discharge end portion, said extrusion head comprising a stationary part fixedly mounted on said discharge end portion of said extruder cylinder and defining at least one guide channel for guiding extrudate from said cylinder to an extrusion location and providing a seat for an extrusion die for shaping said extrudate, an extrusion die positioned on said seat, two movable extrusion head parts hingedly mounted on said stationary part for movement between a closed position for defining an extrusion orifice for said extrudate and for holding said extrusion die on said seat and an open position for cleaning, each of said movable extrusion head parts having an abutment face, and actuating means for moving each of said movable extrusion head parts between said open position and said closed position, said actuating means comprising a first piston-cylinder unit acting between said stationary extrusion head part and said movable extrusion head part for moving said movable extrusion head part between said open position and said closed position, a second piston-cylinder unit comprising a cylinder mounted on said stationary extrusion head part and a piston having a piston rod extending from said cylinder and having an end portion formed as a draw bar, a tie rod having one end pivotally connected to said draw bar and having at another end an enlarged head portion, and a third piston-cylinder unit having one end pivotally connected with said draw bar and another end pivotally connected with said enlarged head portion of said tie rod, said third piston-cylinder unit acting to press said head portion of said tie rod against said abutment face of enlarged head portion of said movable extrusion head part to clamp said movable extrusion head part in closed position, and an electrical-hydraulic control system for actuating said piston-cylinder units, said system comprising a hydraulic supply system for supplying hydraulic pressure fluid, an electro-magnetic valve for controlling flow of hydraulic pressure fluid from said hydraulic supply system to each of said piston-cylinder units respectively, an electric circuit for controlling said electromagnetic valves and including a central control unit for individually controlling said electromagnetic valves to activate respective piston-cylinder units in sequence and programmed for moving said movable extrusion head parts from closed position to open position by firstly activating said third piston-cylinder units to free said enlarged head portions of said tie rods from said abutment faces of said movable extrusion head parts, then secondly activating said second piston-cylinder units to move said draw bars and said tie rods away from said movable extrusion head parts and thirdly activating said first piston cylinder units to move said movable extrusion head parts from closed position to open position, said first, second, and third piston-cylinder units being activated sequentially in reverse order to move said movable extrusion head parts from open position to closed position for operation of said extrusion installation.

2. An extrusion head according to claim 1, in which said hydraulic supply system comprises a source of hydraulic fluid, a pump having an intake connected with said source of hydraulic fluid, a motor for driving said pump, a hydraulic distribution line connected to a discharge of said pump and leading to said electro-magnetic valves and a pressure control unit connected with said hydraulic distribution line and connected by an electric line with said central control unit and an electric control line leading from said central control unit to said motor.

3. An extrusion head according to claim 1, further comprising a limit switch for each of said piston-cylinder units, each said limit switch being positioned in a position to be activated at the end of a stroke of a respective piston-cylinder unit and electric lines connecting said limit switches individually with said central control unit.

* * * * *